United States Patent [19]
Preikschat

[11] Patent Number: 4,521,780
[45] Date of Patent: Jun. 4, 1985

[54] TARGET SIMULATION SYSTEM

[76] Inventor: Fritz K. Preikschat, 16020 Lake Hills Blvd., Bellevue, Wash. 98008

[21] Appl. No.: 312,800

[22] Filed: Oct. 19, 1981

[51] Int. Cl.³ .............................................. G01S 7/40
[52] U.S. Cl. .................................. 343/17.7; 343/377
[58] Field of Search .................. 434/2; 343/17.7, 377, 343/368; 350/296

[56] References Cited

U.S. PATENT DOCUMENTS

| 2,934,755 | 4/1960 | Canada | 350/296 X |
| 3,164,827 | 1/1965 | Preikschat | 343/6.5 |
| 3,165,742 | 1/1965 | Taylor | 343/17.7 |
| 3,199,107 | 8/1965 | Mills | 343/17.7 |
| 3,266,313 | 8/1966 | Litterst | 350/296 X |
| 3,611,381 | 10/1971 | Preikschat | 343/100 |

OTHER PUBLICATIONS

APPA: A Phased Array System Designed for Space Application, Nitardy et al., IEEE Transactions on Aerospace and Electronic Systems, vol. AES-6, No. 4, Jul. 1970.

Primary Examiner—Maynard R. Wilbur
Assistant Examiner—M. R. Gordon
Attorney, Agent, or Firm—Christensen, O'Connor, Johnson & Kindness

[57] ABSTRACT

The target simulation system includes a reflector 18 located within a closed and shielded room 10. An array 30 of transmitting elements is located within an opening 22 of the room so that the array is centered at a first focal point $F_1$ of an ellipsoidal reflecting surface 18A of the reflector, and a receiving element of the target seeker 34 to be tested is located within an opening 24 so that the receiving element is centered at a second focal point $F_2$ of the ellipsoidal reflecting surface. Phased array control system 32 causes the array to simultaneously and independently transmit a plurality of beams of radiation toward the reflector and each transmitted beam results in a corresponding reflected beam whose beam axis passes through the second focal point of the array so that each reflected beam simulates radiation coming from a distinct target. In the case where the radiation is electromagnetic radiation in the MMW range, the phased array control system (FIGS. 2 and 3) performs all phasing and modulation that is required for the steering and focusing of each beam and for the simulation of target range, target characteristics and target seeker characteristics at an intermediate frequency.

22 Claims, 7 Drawing Figures

TARGET SIMULATION SYSTEM

FIELD OF THE INVENTION

This invention generally relates to target simulation systems, and, more particularly, to such a system which is capable of simultaneously and independently simulating multiple targets for the purpose of testing millimeter wave target seekers.

BACKGROUND OF THE INVENTION

A target seeker is any device that receives and evaluates radiation for the purpose of determining the physical location of a target relative to the target seeker. Target seekers generally are classified either as active or passive. An active target seeker is one which transmits radiation and which receives and evaluates returns of the transmitted radiation from the target and other objects in the vicinity of the target. A typical active target seeker uses radar principles in which the transmitted radiation and the returns thereof comprise continuous or pulsed electromagnetic signals. A passive target seeker does not actively transmit any radiation, but rather receives and evaluates particular types of radiation from the target and objects in the vicinity thereof. A typical passive target seeker is one which receives and evaluates radiation in the infrared spectrum.

In the testing of target seekers, it is desirable to simulate the target (and, if desired, objects in the vicinity of the target). Without simulation, it would be impossible or impractical to duplicate all conditions under which the target seeker would be expected to operate. With simulation, most conditions of target seeker operation can be carefully controlled and duplicated. Accordingly, a number of target simulation systems either have been developed or proposed for the testing of both active and passive target seekers. Each of these systems simulates a target by directing radiation toward the target seeker in a manner so that the radiation appears to be coming from a target at a desired physical location relative to the target seeker. None of these systems, however, possesses in combination the following features:

the simultaneous and independent simulation of multiple targets, each at a different physical location relative to the target seeker;

wide variations in target angle for each such target; and, the simulation of millimeter wave (MMW) radiation from each such target.

It is therefore an object of this invention to provide an improved target simulation system for use in the testing of target seekers.

It is a further object of this invention to provide such a target simulation system which is capable of simultaneously and independently simulating multiple targets.

It is yet a further object of this invention to provide such a target simulation system which is capable of wide variations in target angle for each target so simulated.

It is another object of this invention to provide such a target simulation system which is capable of simultaneously and independently simulating multiple targets over a wide variation of target angles for the purpose of testing MMW target seekers.

SUMMARY OF THE INVENTION

The improved target simulation system comprises:

a reflector having a substantially ellipsoidal reflecting surface;

an array of transmitting elements, the center of the array being located at a first focal point of the ellipsoidal reflecting surface;

a phased array control system for causing the array to transmit toward the ellipsoidal reflecting surface at least one beam of radiation whose beam axis has a predetermined angle relative to the array, whereby the transmitted beam is reflected by the ellipsoidal reflecting surface to result in a corresponding reflected beam whose beam axis passes through a second focal point of the ellipsoidal reflector; and means for mounting the target seeker to be tested so that a receiving means of the target seeker is located at the second focal point of the ellipsoidal reflecting surface, whereby the reflected beam simulates radiation coming from a target at a predetermined angle relative to the target seeker that is defined by the predetermined angle of the corresponding transmitted beam.

The phased array control system may be designed to cause the array to simultaneously and independently transmit a plurality of beams of radiation. Due to the system structure described, each such transmitted beam is reflected by the ellipsoidal reflecting surface to result in a corresponding reflected beam whose beam axis passes through the second focal point, whereby each reflected beam simulates radiation coming from a distinctive target at a predetermined angle relative to the target seeker that is defined by the predetermined angle of the corresponding transmitted beam.

In the case where the target seeker under test is designed to receive and evaluate MMW radiation, the phased array control system may include:

a plurality of steering and RF modulation circuits, one for each element of the array;

a source of an IF carrier;

means for providing a plurality of phase control signals, each phase control signal representing the phase for a corresponding one of the elements of the array that is required to steer the transmitted beam to a predetermined angle;

a source of an RF carrier whose wavelength is in the millimeter wave range;

means supplying the IF carrier to each of the plurality of steering and RF modulation circuits;

means supplying the RF carrier to each of the plurality of steering and RF modulation circuits;

means supplying each phase control signal to the corresponding one of the plurality of steering and RF modulation circuits; and, wherein each steering and RF modulation circuit includes: phase-control means for controlling the phase of the IF carrier in accordance with the phase control signal supplied thereto and providing a corresponding output signal; and, means modulating the output signal onto the RF carrier and coupling only the upper sideband resulting from the modulation to the corresponding element of the array.

In order to simulate certain items such as target range, target characteristics and target seeker characteristics, the IF carrier is modulated with an appropriate modulating signal consisting of the desired modulation before the IF carrier is supplied to the steering and RF modulation circuits.

In a preferred embodiment, the IF carrier is divided into sine and cosine components, and both sine and cosine components of the IF carrier are supplied to each of the steering and RF modulation circuits. First and second phase control signals are provided for each element of the array and respectively represent the sine and cosine of the required phase for that element. Within each steering and RF modulation circuit, the sine component of the IF carrier is attenuated in relation to the first phase control signal and the cosine component of the IF carrier is attenuated in relation to the second phase control signal. The resultant attenuated sine and cosine components of the IF carrier are then vectorially combined to develop the output signal which is modulated onto the RF carrier.

BRIEF DESCRIPTION OF THE DRAWINGS

The invention can best be understood by reference to the following portion of the specification, taken in conjunction with the accompanying drawings in which.

DESCRIPTION OF THE PREFERRED EMBODIMENT

While the invention will be described with reference to a preferred embodiment that is particularly adapted for testing an active target seeker designed to receive and evaluate MMW radiation, it will be apparent from the ensuing discussion that the invention is not limited thereto and may be used with suitable modification in the testing of other active and passive target seekers.

Figure 1:
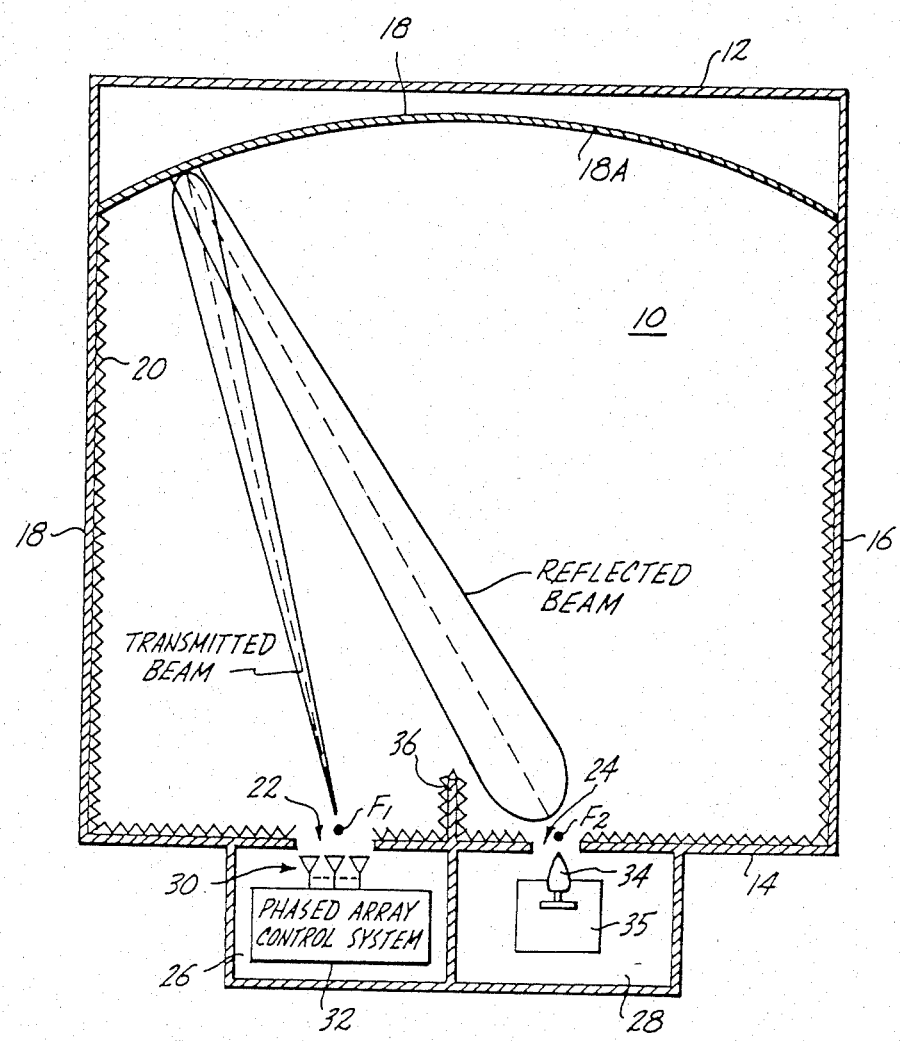
FIG. 1 is a plan view of the target simulation system including an array of transmitting elements and a phased array control system therefor.

With reference now to FIG. 1, the target simulation system includes a closed and shielded room 10 that is defined by side walls 12, 14, 16 and 18 and opposing top and bottom walls (not illustrated). A reflector 18 having an ellipsoidal reflecting surface 18A is located within room 10 adjacent side wall 12 and extends between said walls 16 and 18 and the top and bottom walls. The inside surfaces of side walls 14, 16 and 18 and of the top and bottom walls are lined with an absorptive material 20 so that reflector 18, side walls 14, 16 and 18, and the top and bottom walls define a closed chamber that is substantially anechoic. An opening 22 is provided in side wall 14 surrounding a first focal point $F_1$ of ellipsoidal reflecting surface 18A, and an opening 24 is provided in side wall 14 surrounding a second focal point $F_2$ of ellipsoidal reflecting surface 18A. Openings 22 and 24 communicate, respectively, with closed and shielded rooms 26 and 28 located adjacent side wall 14. An array 30 of transmitting elements is positioned within opening 22 so that the center of the array is located at focal point $F_1$, and the array is controlled by a phased array control system 32 located within room 26. A target seeker 34 to be tested is located within room 28 by a mounting means 35 so that the receiving means of target seeker 34 is positioned within opening 24 at focal point $F_2$. Target seeker 34 may be mounted in a fixed position, or may be mounted on a gimbaled platform so as to simulate pitch, roll, and yaw movements that would be experienced in the case where the target seeker were to mounted on a vehicle.

In the preferred embodiment, target seeker 34 is a MMW target seeker of the active type which functions to transmit MMW radiation (e.g., in the frequency range 30 to 300 GHz) in a particular manner and to receive and evaluate returns of that transmitted radiation in order to determine the physical location of a target or targets relative to the target seeker. In the use of the target simulation system, the transmit function of the target seeker is disabled and the receive and evaluation functions are tested by simulating returns of MMW radiation from multiple targets in the following manner.

Array 30 preferably comprises a circular array of transmitting elements (as discussed in detail hereinafter with reference to FIG. 4), and phased array control system 32 is operative to cause array 30 to transmit one or more beams of MMW radiation toward reflector 18. Since array 30 is located at focal point $F_1$ and since the receiving means of target seeker 24 is located at focal point $F_2$, any such transmitted beam will be reflected by ellipsoidal reflecting surface 18A back to target seeker 24 so that the maximum power of the reflected beam will be centered on the receiving means of the target seeker notwithstanding the angle of incidence of the reflected beam. Because array 30 is a circular and therefore two-dimensional array, the angle of each transmitted beam can be controlled in orthogonal coordinate directions. Due to the nature of ellipsoidal reflecting surface 18A, the angle of each such transmitted beam will cause the corresponding reflected beam to have a definite angle of incidence (or target angle) on the receiving means of target seeker 34. By accordingly controlling the angle of each transmitted beam, the simulation at target seeker 34 of MMW radiation from one or more targets over a wide variation of target angles may be effected.

In order to simplify the calculations required to determine the transmitted beam angle from the desired target angle, it is assumed that reflector 18 has a spherical surface. It is then important to insure that ellipsoidal reflecting surface 18A approximates a spherical surface as closely as possible. Such approximation may be effected, for example, by locating openings 22 and 24 as close to each other as possible (given the physical dimensions of array 30 and of target seeker 34 and its associated mount) and by subdividing reflector 18 into a plurality of triangular-shaped subreflectors each having a spherical surface.

In addition to simulation of target angle, the system in FIG. 1 also permits the simulation of target range, target characteristics, and target seeker characteristics. Target range may be simulated by appropriate modulation of the transmitted beam and/or by focusing of the transmitted beam (in the case where it is desired to simulate a target at infinity, a planar wavefront must be received at the target seeker which requires that the transmitted beam be focused midway along the beam axis between array 30 and ellipsoidal reflector 18). Target characteristics (sometimes referred to as the target signature), such as the absorptive and reflective characteristics of the target, and electronic countermeasures taken by the target may be simulated by appropriate modulation of the transmitted beam. Target seeker characteristics (specifically relating to the transmit function of the target seeker) may be simulated by controlling the frequency of the transmitted beam (to match the transmit frequency of the target seeker) and by appropriate modulation of the transmitted beam (to simulate pulse repetition frequencies, chirp frequencies, and so forth).

Provided that phased array control system 32 is properly designed, array 30 has the capability of producing multiple and independent transmitted beams at different angles. Since each of these multiple transmitted beams will have its beam axis passing through the center of array 30 and therefore focal point $F_1$, it can be seen that each of the corresponding reflected beams will have a beam axis that passes through focal point $F_2$ and that is therefore incident on the receiving means of target seeker 34.

Room 10 also includes a stub wall 36 projecting from side wall 14 between openings 22 and 24 and extending between the top and bottom walls of room 10. Stub wall 36 is preferably covered with absorptive material and is otherwise designed so as to substantially prevent the side lobes of the transmitted beams (which can be minimized in the manner to be discussed hereinafter) from reaching target seeker 34. The factors involved with the design and construction of stub wall 36 may be similar to those involved with the design and construction of antireflection fences used in radar systems (reference U.S. Pat. No. 3,164,827).

Figure 4:
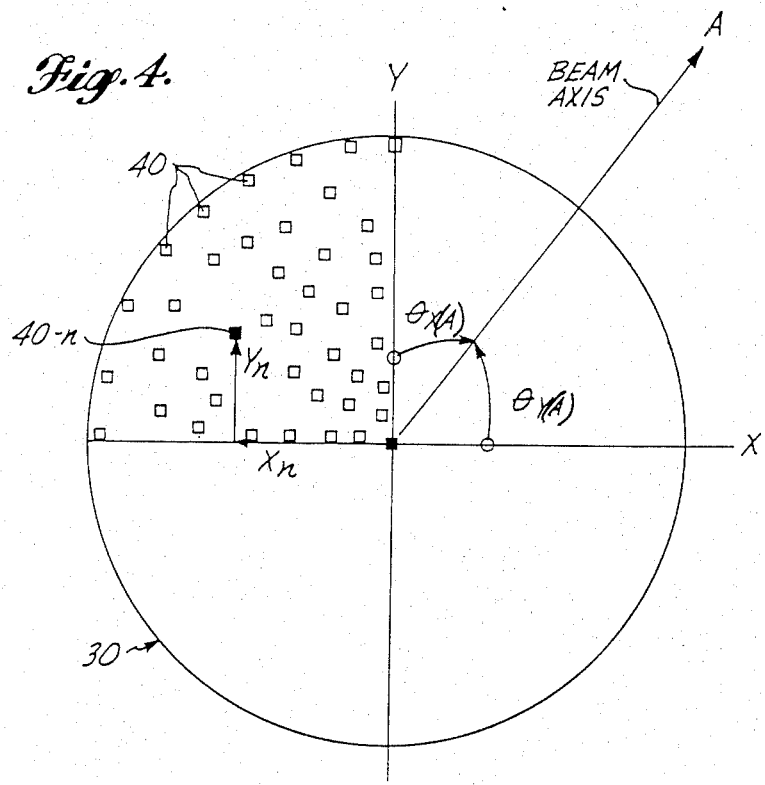
FIG. 4 is an elevation view of the array.

Referring now to FIG. 4, array 30 includes a plurality of transmitting elements 40 disposed in a substantially planar and circular array (only representative elements in one quadrant of the array are illustrated). As is well known, each beam transmitted by the array is formed from the individual signals transmitted by elements 40 and the angle of the transmitted beam relative to the array is controlled by controlling the phasing of the individual element signals. If it is desired to transmit a nonfocused beam (i.e., that having a planar wavefront) parallel to the plane of the array, then all individual element signals have the same phasing. If it is desired to transmit a beam A whose beam axis is at an angle $\theta_{x(A)}$ from a plane containing the y-axis of the array and at an angle $\theta_{y(A)}$ from an orthogonal plane containing the x-axis of the array, then the required phase $\phi_{n(A)}$ for the signal transmitted by the nth element of the array (40-n) can be determined by combining the x-component of that phase and the y-component of that phase.

In the case where beam A has a planar wavefront, it can be shown that the x-component of the phase $\phi_{n(A)}$ is:

$$\phi_{xn(A)} = \text{MOD } 360° \left[ \frac{x_n}{\lambda} \tan \theta_{x(A)} \right] \quad (1)$$

where:
$x_n$ = the distance along the x-axis from the center of the array to the nth element,
$\lambda$ = the beam wavelength, and
MOD 360° = the remainder after subtracting all integral multiples of 360° from the phase.

It can also be shown that the y-component of the phase $\phi_{n(A)}$ is:

$$\phi_{xn(A)} = \text{MOD } 360° \left[ \frac{y_n}{\lambda} \tan \theta_{y(A)} \right] \quad (2)$$

where: $y_n$ = the distance along the y-axis from the center of the array to the nth element.

The characteristics of each transmitted beam are determined in a large part by the characteristics of the transmitting elements and their arrangement in the array. Assuming that the array is to transmit beams over a total angle of 60°, that the array has an aperture (or diameter) of 60λ, and that each transmitting element is a ½λ dipole, it can be shown that 11,000 transmitting elements are required. By using 3λ horns rather than ½λ dipoles, the number of transmitting elements can be reduced to 314. If all the transmitting elements are equally spaced in the array and all the individual element signals have the same amplitude, the resultant side lobes of the transmitted beam are relatively large. Significant side lobe attenuation can be achieved in two ways: first, by having the amplitudes of the individual element signals follow a cosine-square or Taylor distribution in both orthogonal directions; second, by having all the individual element signals have the same amplitude and by achieving the effect of a cosine-square or Taylor amplitude distribution through reducing the number of elements in the array and varying the element spacings, as shown in the ITT Handbook, fifth edition, pages 25–33. By so "thinning" the array, it is anticipated that the number of transmitting elements can be reduced to 200 or less to accordingly reduce the complexity and expense of the array and its phased array control system.

Although the phase control required for beam steering (and focussing) could be accomplished at the frequency of the transmitted beam through direct phase control of an RF carrier, it is preferable to effect phase control at a lower or intermediate (IF) frequency by appropriately controlling the phase of a reference IF carrier. The phase-controlled IF carrier is then modulated onto the RF carrier, and the lower sideband and RF carrier of the resultant signal product are suppressed so that only the upper sideband is supplied to the transmitting element. By proceeding in this manner, certain advantages are obtained: first, it is very difficult to achieve phase accuracy and stability at RF frequencies in the millimeter wave range, and relatively easy to achieve such phase accuracy and stability at IF frequencies; second, the IF carrier can also be modulated in an appropriate manner to simulate desired target range, target characteristics, and target seeker characteristics; and, third, it is not necessary to redesign the phased array control system and to recompute the phasings required for beam steering and focussing in the event that the RF carrier frequency and/or amplitude are changed to accommodate different types of target seekers or different target seeker operating modes.

Figure 2:
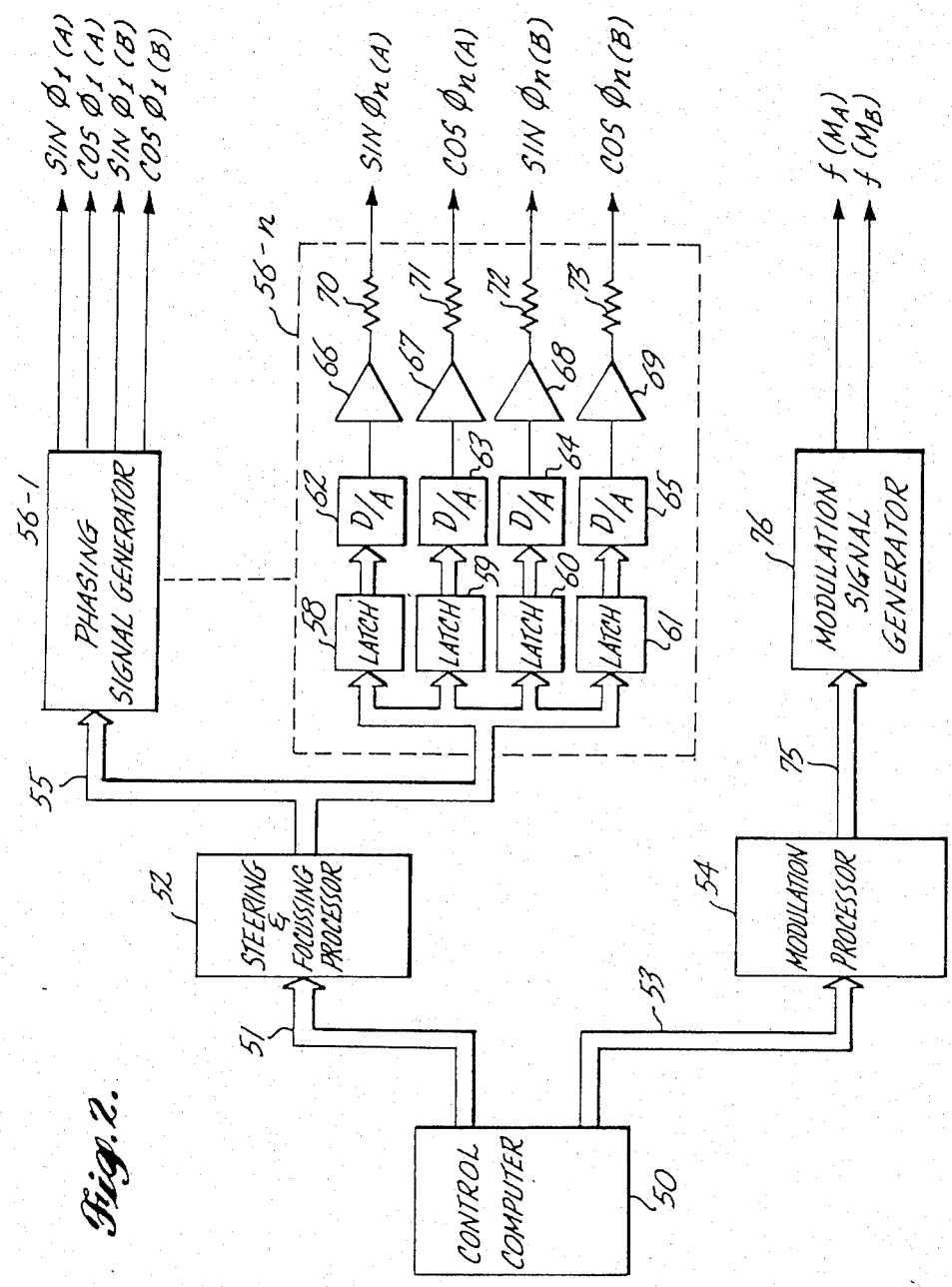
FIG. 2 is a block diagram of a first portion of the phased array control system.

With reference now to FIG. 2, a control computer 50 determines the appropriate angles and focussing for a plurality of transmitted beams and also determines the desired modulation (for the simulation of range, target characteristics and target seeker characteristics) for each such transmitted beam. Instruction signals representing the transmitted beam angles and focussing are transmitted by computer 50 to a steering and focussing processor 52 via a data bus 51 (with such signal transfer being controlled by various address and control signals, not illustrated), and instruction signals representing the beam modulations are transmitted by computer 50 to a modulation processor 54 via a data bus 53 (with such signal transfer being controlled by various address and control signals, not illustrated). From the instruction signals provided by control computer 50, steering and focussing processor 52 determines the phase that is required for each element of the array for each beam (in accordance with relations similar to relations (1) and (2) previously discussed) at the wavelength of the IF carrier. Processor 52 then determines the sine and cosine of each such phase, and provides signals representing the sine and cosine of each such phase to each of a plurality of phasing signal generators 56-1 . . . 56-n (one for each element of the array) via a data bus 55.

Considering now phasing signal generator 56-n for the nth element of the array (40-n), let it be assumed that two targets are to be simulated and that it is accordingly necessary to have two transmitted beams A and B. Within phasing signal generator 56-n, the signals on data bus 55 representing the sine and the cosine of the phase for the nth element for each of beams A and B are stored in appropriate latches 58, 59, 60 and 61 by control signals (not illustrated) from steering processor 54. Digital-to-analog (D/A) converters 62, 63, 64 and 65 convert the signals in corresponding latches 58, 59, 60 and 61 into corresponding analog voltages which are amplified by corresponding amplifiers 66, 67, 68 and 69. The analog voltages appearing on the outputs of the amplifiers are converted into corresponding currents by corresponding resistors 70, 71, 72 and 73. These currents accordingly represent the sine and the cosine of the phase for the nth element for beam A ($\sin \phi_{n(A)}$, $\cos \phi_{n(A)}$) and the sine and cosine of the phase for the nth element for beam B ($\sin \phi_{n(B)}$, $\cos \phi_{n(B)}$).

Each of the remaining phasing signal generators is constructed and operates in a similar manner to accordingly provide output currents representing the sine and the cosine of the phase for its element for beam A and the sine and the cosine of the phase for its element for beam B.

From the instruction signals provided by control computer 50, modulation processor 54 determines the appropriate modulation for each of beams A and B and supplies signals representing the appropriate modulation to a modulation signal generator 76 via a data bus 75. In response to the signals on data bus 75, modulation signal generator 76 develops appropriate modulating signals $f(M_A)$ and $f(M_B)$ consisting of the desired modulation for beams A and B, respectively. In the case of a MMW target seeker, the modulation may consist of: the pulse repetition frequency (PRF) of the target seeker (which is generally in the range below 10 kHz); chirp, electronic countermeasures (ECM) and target signature frequencies (which are generally in the range of 1 MHz to 100 MHz); and, a time-variable amplitude representing range, target reflective or absorptive characteristics, and so forth. To give an example, the modulating signal for beam A may be represented by the relation:

$$f(M_A) = M_A(t) \cos pt \qquad (3)$$

where:
$M_A(t)$ = the time-variable amplitude of the modulation, and cos $pt$ = a function of the modulation frequency (s), with $p$ equal to the sum of all such modulation frequencies.

Figure 3:
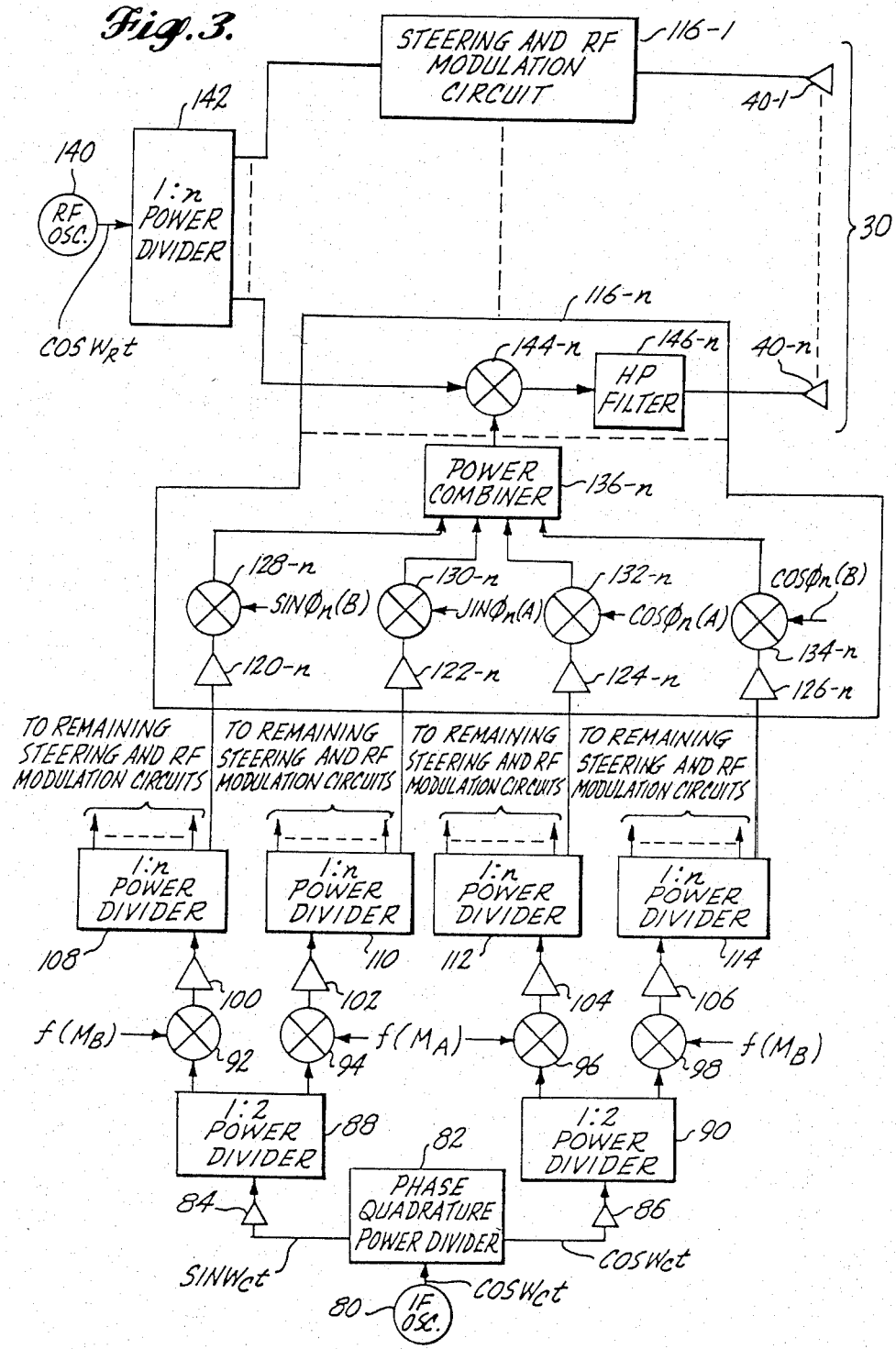
FIG. 3 is a block diagram of a second portion of the phased array control system.

With reference now to FIG. 3, the reference IF carrier at a desired IF frequency $\omega_c$ (in the case of a MMW target seeker, a typical IF frequency would be 500 MHz) is obtained from an IF oscillator 80. The IF carrier, which is represented by the function $\cos \omega_c t$, is supplied to the input of a phase quadrature power divider 82 whose output signals are the sine and cosine components of the IF carrier (represented by the functions $\sin \omega_c t$ and $\cos \omega_c t$, respectively). As will be appreciated from the discussion hereinafter, the IF carrier is divided into sine and cosine components in order that the phase control required for beam steering and focussing may be effected in a very accurate manner by controlling the amplitude of the sine and cosine components (after modulation thereon) and by subsequently obtaining the vector sum of the sine and cosine components.

The sine and cosine components of the IF carrier are amplified in respective amplifiers 84 and 86 and then supplied to the inputs of respective power dividers 88, 90. Each of power dividers 88 and 90 has a number of outputs corresponding to the number of transmitted beams and is operative to divide the IF carrier component at its input equally among its various outputs. In the example being discussed in which there are two transmitted beams A and B, dividers 88 and 90 are according 1:2 power dividers having a single input and two outputs. The sine component of the IF carrier appearing on the outputs of divider 88 is supplied to first inputs of IF mixers 92 and 94, and the cosine component of the IF carrier appearing on the outputs of divider 90 is supplied to first inputs of IF mixers 96 and 98. Second inputs of mixers 94 and 96 are supplied with modulating signal $f(M_A)$ consisting of the modulation for beam A, and second inputs of mixers 92 and 98 are supplied with modulating signal $f(M_B)$ consisting of the modulation for beam B. It will be appreciated that the outputs of mixers 94 and 96 comprise the sine and cosine components of the IF carrier, with the modulation for beam A. The output from mixer 94 may therefore be represented as $$M_A(t) \sin [\omega_c t + \pi(t)] = M_A(t) \cos [\omega_c t + \rho(t) + \pi/2] \qquad (4)$$

and the output from mixer 96 may therefore be represented as $$M_A(t) \cos [\omega_c t + \rho(t)] \qquad (5)$$

Likewise, the output signals from mixers 92 and 98 represent the sine and cosine componets of the IF carrier, with the modulation for beam B.

The output signals from mixers 92, 94, 96 and 98 are amplified in respective amplifiers 100, 102, 104 and 106, and then supplied to inputs of respective power dividers 108, 110, 112 and 114. Each of dividers 108, 110, 112 and 114 has n outputs (one for each element of the array) and is operative to divide the signal at its input equally among its n outputs. One of the outputs from each dividers 108, 110, 112 and 114 is coupled to each of a plurality of steering and RF modulation circuits 116-1 . . . 116-n, with one such circuit being provided for each element of the array. Accordingly, each steering and RF modulation circuit is provided with the A-beam modulated sine and cosine components of the IF carrier and the B-beam modulated sine and cosine components of the IF carrier.

Considering now circuit 116-n for the nth element (each of these circuits is identical in construction and operation), the output signals from dividers 108, 110, 112 and 114 are amplified in respective amplifiers 120-n, 122-n, 124-n and 126-n, and then supplied to first inputs of respective attenuators comprising double-balanced mixers 128-n, 130-n, 132-n and 134-n. Accordingly, the first inputs of double-balanced mixers 128-n, 130-n, 132-n and 134-n receive, respectively, voltages comprising the B-beam modulated sine component of the IF carrier, the A-beam modulated sine component of the IF carrier, the A-beam modulated cosine component of the IF carrier, and the B-beam modulated cosine component of the IF carrier. The currents from phasing signal generator 56-n (FIG. 2) and representing $\sin \phi_{n(B)}$, $\sin \phi_{n(A)}$, $\cos \phi_{n(A)}$, and $\cos \phi_{n(B)}$ are supplied to second inputs of double-balanced mixers 128-n, 130-n, 132-n and 134-n.

Figure 5:
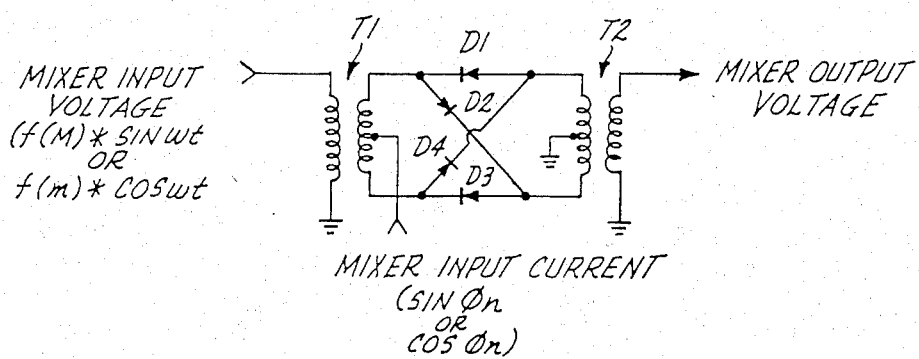
FIG. 5 is a schematic diagram of a double-balanced mixer used as an attenuator in the portion of the phased array control system in FIG. 3.

A typical double-balanced mixer is seen in FIG. 5 to comprise transformers T1 and T2, and diodes D1, D2, D3 and D4 interconnecting first windings of transformers T1 and T2 and poled to conduct in a ring-like manner. The voltage comprising the modulated sine or cosine component of the IF carrier is applied across a second winding of transformer T1, and the current comprising the sine or cosine of the phase for the element and the beam is supplied to a centrally-located tap on the first winding of transformer T1. The mixer output voltage appears across the second winding of transformer T2, and the second windings of transformers T1 and T2 and a center tap on the first winding of transformer T2 are each connected to reference potential.

Figure 6:
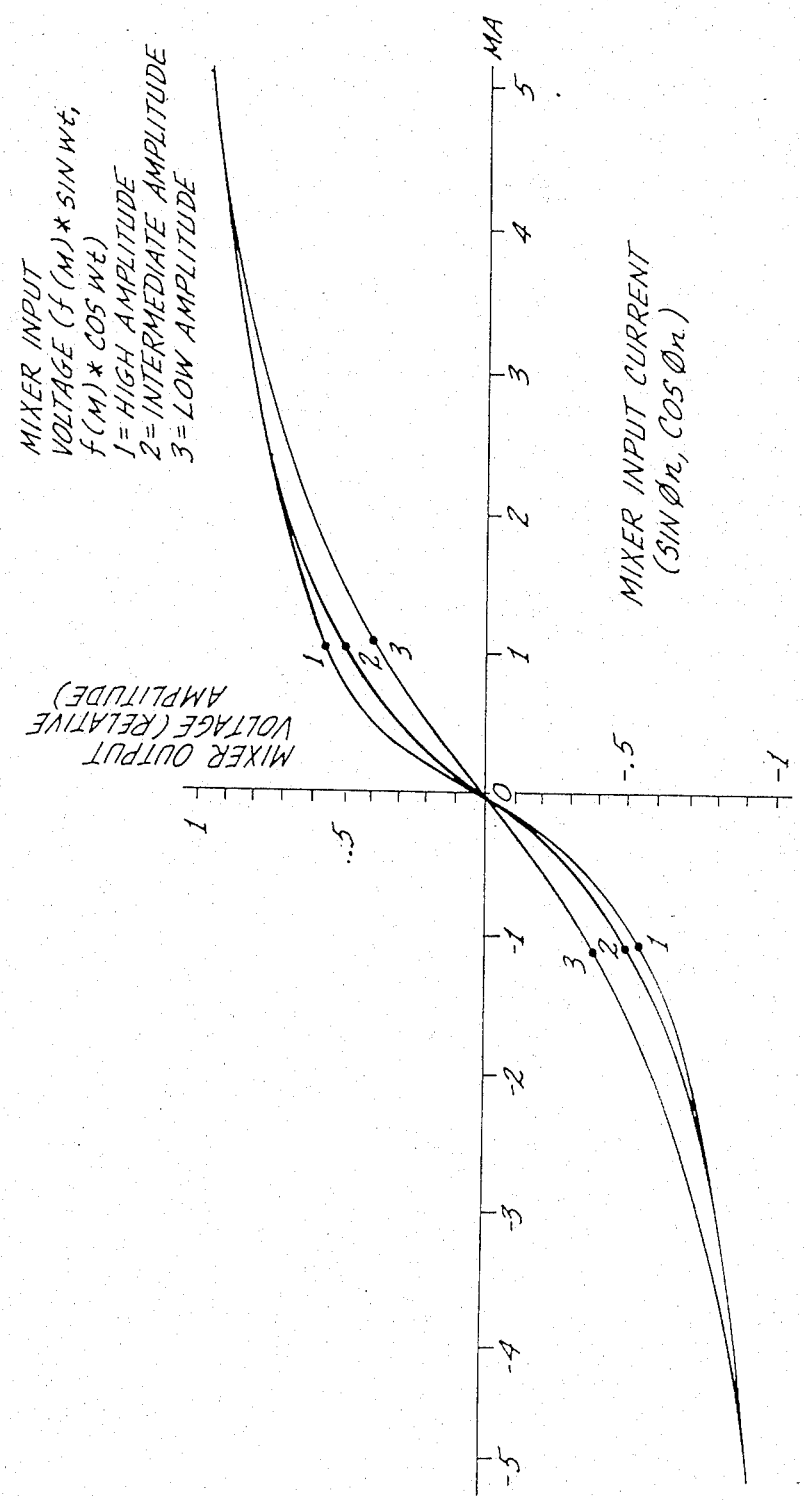
FIG. 6 is a graph illustrating the operation of the double-balanced mixer.

When a double-balanced mixer is provided with signals of the type described, the mixer output voltage comprises the mixer input voltage (that applied across the second winding of transformer T1) attenuated in relation to the mixer input current (that supplied to the center tap of the first winding of transformer T1). With additional reference now to the graph in FIG. 6, it will be seen that the mixer output voltage varies in a defined manner relative to the mixer input current. The relation is not linear, however, and a further slight variation occurs with variation in the amplitude of the mixer input voltage (as illustrated by the relative amplitude graphs for high amplitude, intermediate amplitude, and low amplitude mixer input voltages). It is relatively easy, however, to linearize the relation. As an example, steering and focussing processor 52 (FIG. 2) may reference an internal look-up table to accordingly modify the values of the sine of the phase and the cosine of the phase to effect such linearization. As another example, it may be recognized that the impedance of the double-balanced mixer appearing at the center tap of the first winding of transformer T1 will vary and that the value of the resistor (e.g., resistor 70, FIG. 2) providing the mixer input current may be appropriately chosen to smooth out nonlinearities in view of this varying impedance.

The outputs from double-balanced mixers 130-n and 132-n accordingly comprise the A-beam modulated sine and cosine components of the IF carrier, attenuated in proportion to the sine and cosine of the phase for the nth element for beam A. The output from mixer 130-n may therefore be represented as $$\sin \phi_{n(A)} M_A(t) \cos [\omega_c t + \rho(t) + \pi/2] \qquad (6)$$

and the output signal from mixer 132-n may therefore be represented as $$\cos \phi_{n(A)} M_A(t) \cos [\omega_c t + \rho(t)] \qquad (7)$$

Likewise, the output signals from mixers 128-n and 134-n comprise the B-beam modulated sine and cosine components of the IF carrier, attenuated in proportion to the sine and cosine of the phase for the nth element for beam B.

The output signals from mixers 128-n, 130-n, 132-n and 134-n are supplied to respective inputs of a power combiner 136-n which is constructed so as to provide a single output signal that comprises the vector sum of all signals provided to its inputs. Considering now only beam A, the corresponding component of the output signal from power combiner 136-n comprising the vector sum of the output signals from mixers 130-n and 132-n may be represented as $$M_A(t) \exp[j(\omega_c t + \rho(t) + \phi_{n(A)})] \qquad (8)$$

From relation (8), it can be appreciated that the required phasing of the IF carrier for steering and focussing of beam A has been achieved by taking the vector sum of the sine and cosine components of that carrier. A relation similar to relation (8) can be set forth for beam B, and the output signal from power combiner 136-n comprises all modulation and phasing of the IF carrier that is required for both beams A and B.

The desired RF carrier at a frequency $\omega_R$ (as previously discussed, the MMW range is 30 to 300 GHz) is obtained from an RF oscillator 140 and is represented by the function $\cos \omega_R t$. The RF carrier is supplied to the input of a power divider 142 that has n outputs, one for each element of the array, and that is operative to divide the RF carrier at its input equally among its n outputs. The RF carrier appearing at each of the outputs of power divider 142 is supplied to the input of a corresponding one of the steering and RF modulation circuits 116-1 ... 116-n. Considering now circuit 116-n, the RF carrier is supplied therein to a first input of an RF mixer 144-n to whose second input is supplied the output signal from power combiner 136-n. The output signal from mixer 144-n accordingly consists of the RF carrier and upper and lower sidebands comprising the modulated and phase-shifted IF carrier. Since the RF carrier does not contain any phase information or modulation and since the phase information in the lower sideband is inverted from the phase information in the modulated and phase-shifted IR carrier, both the RF carrier and the lower sideband are suppressed by a high pass filter 146-n so that only the upper sideband is coupled to the corresponding transmitting element 40-n. Considering now only beam A, the corresponding component of the signal coupled to the nth element of the array (40-n) may be represented as $$M_A(t) \exp[j(\omega_R t + \omega_c t + \rho(t) + \phi_{n(A)})] \qquad (9)$$

In like manner, only the upper sideband resulting from mixing of the RF carrier with the modulated and phase-shifted IF carrier for the remaining transmitting elements is coupled to each of the remaining transmitting elements by its corresponding steering and RF modulation circuit.

Since all phase control for beam steering and focussing and all modulation is done on the IF carrier, it can be appreciated that the phased array control system can be readily adapted for operation at different RF frequencies and amplitudes by simply modifying or changing RF oscillator 140, power divider 142, and that portion of each steering and RF modulation circuit that includes the RF mixer and high pass filter.

Figure 7:
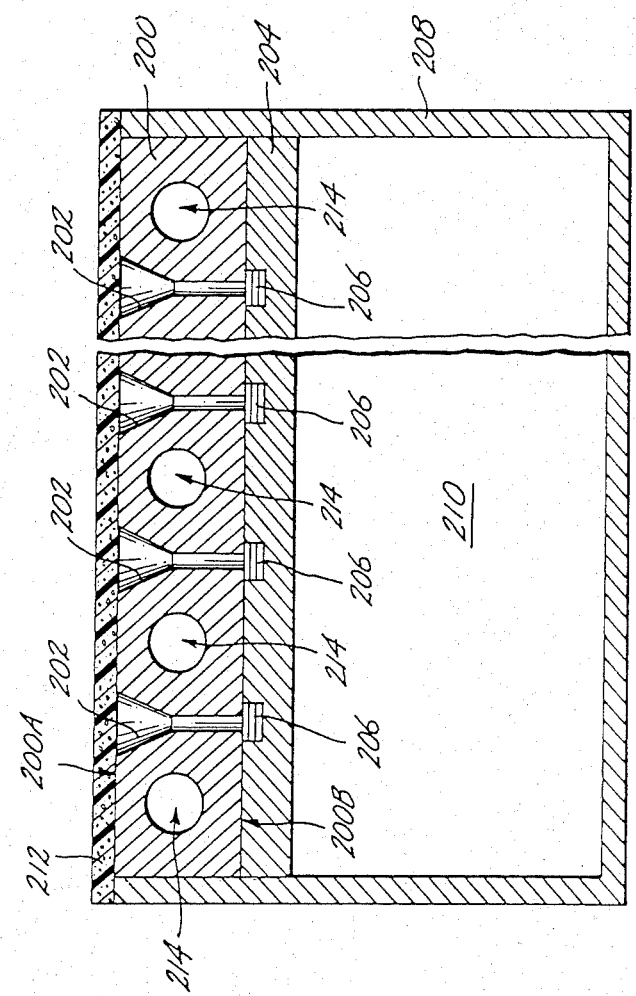
FIG. 7 is a cross-sectional view of an embodiment of the array particularly adopted for simulating MMW radiation from a target and a cryogenic background for that radiation.

Certain types of target seekers have the capability of determining the relative physical location of a target that is viewed by the target seeker against the sky or space, by receiving and evaluating very low-levels of MMW radiation from the target and by distinguishing such radiation from the very low temperature or cryogenic background surrounding the target. In order that the target simulation system may simulate not only MMW radiation from a target but also a cryogenic background for that radiation, the embodiment of array 30 illustrated in FIG. 7 may be used.

The array includes a first mounting plate 200, of a metallic or other material having a high thermal conductivity, that has formed or mounted therein a plurality of horns 202 for the transmitting elements of the array. Horns 202 are spaced in the array in the manner previously described, and each horn extends from a surface 200A of plate 200 that faces reflector 18 (FIG. 1) to an opposing surface 200B of plate 200. A second mounting plate 204 is located adjacent surface 200B and contains the remaining portions 206 of the transmitting elements, with each such remaining portion 206 being in registry with the corresponding horn 202 of its transmitting element. Plates 200 and 204 are mounted within an open-ended container and frame 208 so as to define a chamber 210 within container and frame 208. Surface 200A of plate 200 and the adjacent portions of container and frame 208 are covered with a layer 212 of a material having low thermal conductivity and low radiation absorptive characteristics, and plate 200 is provided with a plurality of passageways 214.

Passageways 214 are supplied (by means not illustrated) with a fluid at a cryogenic temperature. From a consideration of the system structure previously described in conjunction with FIG. 1, it will be appreciated that the receiving element of target seeker 34 sees only array 30 over the entire ellipsoidal reflecting surface 18A of reflector 18. Since the array is maintained at a cryogenic temperature by the fluid supplied to passageways 214 and by the high thermal conductivity of plate 200, the receiving element of target seeker 34 will accordingly "see" a cryogenic background over its entire field of view. By controlling the array in the manner previously described so that the transmitting elements of the array provide one or more transmitted beams of MMW radiation, the simulation of MMW radiation for one or more targets viewed against a cryogenic background may be accomplished. To supplement the simulation of the cryogenic background, a collar (not illustrated) that is maintained at a cryogenic temperature may be mounted on wall 14 (FIG. 1) surrounding opening 24.

In order to avoid condensation and frosting on the structure of the array, chamber 210 is provided with dehumidified air. Layer 212 likewise prevents condensation and frosting on surface 200A and the adjacent portions of container and frame 208 while yet permitting MMW radiation from the transmitting elements of the array to pass therethrough.

While the invention has been described with reference to a preferred embodiment, it is clearly to be understood by those skilled in the art that the invention is not limited thereto but rather that the scope of the invention is to be interpreted only in conjunction with the appended claims.

The embodiments of the invention in which an exclusive property or privilege is claimed are defined as follows:

1. A target simulation system for testing target seekers, said system comprising:
    a reflector having a substantially ellipsoidal reflecting surface;
    an array of transmitting elements, the center of said array being located at first focal point of said ellipsoidal reflecting surface;
    a phased array control system for causing said array to transmit toward said ellipsoidal reflecting surface at least one beam of radiation whose beam axis has a predetermined angle relative to said array, whereby said transmitted beam is reflected by said ellipsoidal reflecting surface to result in a corresponding reflected beam whose beam axis passes through a second focal point of said ellipsoidal reflecting surface; and,
    means for mounting the target seeker to be tested so that a receiving means of the target seeker is located at said second focal point of said ellipsoidal reflecting surface, whereby said reflected beam simulates radiation coming from a target at a predetermined angle relative to the target seeker that is defined by said predetermined angle of the corresponding transmitted beam.

2. A system as recited in claim 1, further comprising a closed and shielded room defined by a plurality of intersecting walls, said reflector being located in said room adjacent one of said walls so that said ellipsoidal reflecting surface and the remaining walls of said room define a closed chamber, one of said remaining walls that opposes said ellipsoidal reflecting surface having first and second openings therein respectively surrounding said first and second focal points, said array being located in said first opening and the receiving means of the target seeker being tested being located in said second opening.

3. A system as recited in claim 2, wherein said closed chamber is substantially anechoic.

4. A system as recited in claim 3, wherein the inside surfaces of said remaining walls are lined with an absorptive material.

5. A system as recited in claim 1, wherein said ellipsoidal reflecting surface approximates a spherical reflecting surface.

6. A system as recited in claim 1, wherein said array is a two-dimensional, substantially planar array of transmitting elements.

7. A system as recited in claim 6, wherein said array is a circular array of transmitting elements.

8. A system as recited in claim 1, wherein said phased array control system causes said array to simultaneously and independently transmit toward said ellipsoidal reflecting surface a plurality m of beams of radiation, each said transmitted beam having a beam axis at a predetermined angle relative to said array and being reflected by said ellipsoidal reflecting surface to result in a corresponding reflected beam whose beam axis passes through said second focal point, whereby each said reflected beam simulates radiation coming from a distinct target at a predetermined angle relative to the target seeker that is defined by said predetermined angle of its corresponding transmitted beam.

9. A system as recited in claim 8, wherein each said transmitted beam is a beam of electromagnetic radiation.

10. A system as recited in claim 9, wherein the wavelength of said electromagnetic radiation is in the millimeter wave range.

11. A system as recited in claim 10, wherein said array includes n transmitting elements, and wherein said phased array control system includes:

a plurality n of steering and RF modulation circuits, each said steering and RF modulation circuit being connected to a corresponding element of said array;

a source of an IF carrier;

means dividing said IF carrier into sine and cosine components;

a source of a plurality m of modulating signals, each said modulating signal consisting of the modulation desired for a corresponding one of said plurality m of transmitted beams to simulate target range, target characteristics, and target seeker characteristics;

a plurality m of IF mixer groups;

means supplying said sine and cosine components of said IF carrier to each said IF mixer group;

means supplying each said modulating signal to the corresponding one of said plurality m of IF mixer groups;

wherein each said IF mixer group includes first and second IF mixers respectively mixing said modulating signal supplied to said IF mixer group with said sine and cosine components of said IF carrier and respectively providing corresponding beam-modulated sine and cosine components of said IF carrier;

a source of an RF carrier whose wavelength is in the millimeter wave range;

means providing a plurality n of phase control signal groups, each said phase control signal group including m pairs of first and second phase control signals, said first and second phase control signals in each said pair respectively representing the sine and the cosine of the phase for the corresponding one of said plurality n of transmitting elements to steer the corresponding one of said plurality m of transmitted beams;

means supplying said beam-modulated sine and cosine components of said IF carrier to each of said plurality n of steering and RF modulation circuits;

means supplying said RF carrier to each of said plurality n of steering and RF modulation circuits;

means supplying each of said plurality n of phase control signal groups to the corresponding one of said plurality n of steering and RF modulation circuits;

wherein each said steering and RF modulation circuit comprises: a plurality m of attenuating means groups, each said attenuating means group including first and second attenuating means respectively attenuating the corresponding beam-modulated sine and cosine components of said IF carrier in relation to the first and second phase control signals in the corresponding pair for the corresponding beam and providing first and second output signals representing, respectively, the attenuated, beam-modulated sine and cosine components of said IF carrier; combining means for providing a third output signal representing the vector sum of the first and second output signals from all of said plurality m of attenuating means groups; and, means modulating said third output signal onto said RF carrier and coupling only the upper sideband corresponding to said modulation to the corresponding one of said plurality n of transmitting elements.

12. A system as recited in claim 11, wherein each said attenuating means includes a double-balanced mixer.

13. A system as recited in claim 11, wherein each said modulating means includes: an RF mixer mixing said third output signal with said RF carrier and providing a corresponding output signal; and, a high-pass filter coupling to said corresponding transmitting element only the upper sideband of the output signal from said RF mixer.

14. A system as recited in claim 1, wherein said radiation is electromagnetic radiation.

15. A system as recited in claim 14, wherein the wavelength of said electromagnetic radiation is in the millimeter wave range.

16. A system as recited in claim 15, wherein said phased array control system includes:

a plurality of steering and RF modulation circuits, one for each element of said array;

a source of an IF carrier;

means providing a plurality of phase control signals, each said phase control signal representing the phase for a corresponding one of the elements of said array that is required to steer said transmitted beam to said predetermined angle;

a source of an RF carrier whose wavelength is in the millimeter wave range;

means supplying said IF carrier to each of said plurality of steering and RF modulation circuits;

means supplying each said phase control signal to the corresponding one of said plurality of steering and RF modulation circuits;

means supplying said RF carrier to each of said plurality of steering and RF modulation circuits; and, wherein each said steering and RF modulation circuit includes: phase-control means controlling the phase of said IF carrier in accordance with said phase control signal supplied thereto and providing a corresponding output signal; and, means modulating said output signal onto said RF carrier and coupling only the upper sideband resulting from said modulation to the corresponding element of said array.

17. A system as recited in claim 16, wherein each said modulating means includes: an RF mixer mixing said output signal with said RF carrier and providing a corresponding output signal; and, a high-pass filter coupling to said corresponding transmitting element only the upper sideband of the output signal from said RF mixer.

18. A system as recited in claim 16, further comprising a source of a modulating signal consisting of the modulation desired for said transmitted beam to simulate target range, target characteristics, and target seeker characteristics; and, means modulating said modulating signal onto said IF carrier before said IF carrier is supplied to each of said plurality of steering and RF modulation circuits.

19. A system as recited in claim 16, wherein said means for supplying said IF carrier includes: means dividing said IF carrier into sine and cosine components; and, means supplying said sine and cosine components and said IF carrier to each of said plurality of steering and RF modulation circuits;

wherein said means providing a plurality of phase control signals includes means providing first and second phase control signals for each element of the array, each said first phase control signal representing the sine of the required phase for the corresponding element and each said second phase control signal representing the cosine of the required phase for the corresponding element; and, wherein said phase control means in each said steering and RF modulation circuit includes: first attenuating means attenuating said sine component of said IF carrier in relation to said first phase control signal and providing a corresponding output signal; second attenuating means attenuating said cosine component of said IF carrier in relation to said second phase control signal and providing a corresponding output signal; and, means vectorially combining said output signals from said first and second attenuating means and providing a corresponding output signal to said modulating means.

20. A system as recited in claim 19, wherein each of said first and second attenuating means comprises a double-balanced mixer.

21. A system as recited in claim 1, further comprising cooling means for maintaining said array at a cryogenic temperature.

22. A system as recited in claim 21, wherein said cooling means includes a mounting plate in which the transmitting elements of said array are located, said mounting plate being of a material having a high thermal conductivity and having defined therein a plurality of passageways for receiving a fluid at a cryogenic temperature.

* * * * *

UNITED STATES PATENT AND TRADEMARK OFFICE
CERTIFICATE OF CORRECTION

PATENT NO. : 4,521,780
DATED : June 4, 1985
INVENTOR(S) : Fritz K. Preikschat

It is certified that error appears in the above-identified patent and that said Letters Patent is hereby corrected as shown below:

| | |
|---|---|
| Column 3, | line 35: "adopted" should be --adapted-- |
| | line 53 & 54: "said walls" should be --sidewalls-- |
| Column 4 | line 9: insert --be-- after "to" |
| Column 8 | line 46: equation should read as follows: |
| | -- $M_A(t) \sin[\omega_c t + \rho(t)] = M_A(t) \cos[\omega_c t + \rho(t) + \pi/2]$ -- |
| | line 54: "componets" should be --components-- |
| | line 52: insert --of-- before "dividers" |
| Column 11 | line 12: "low-levels" should be --low levels-- |

Signed and Sealed this

Tenth Day of December 1985

[SEAL]

Attest:

DONALD J. QUIGG

Attesting Officer

Commissioner of Patents and Trademarks